United States Patent [19]

Rixner et al.

[11] Patent Number: 6,016,531
[45] Date of Patent: *Jan. 18, 2000

[54] APPARATUS FOR PERFORMING REAL TIME CACHING UTILIZING AN EXECUTION QUANTIZATION TIMER AND AN INTERRUPT CONTROLLER

[75] Inventors: Scott W. Rixner, Cambridge, Mass.; Clarence R. Ogilvie, Huntington, Vt.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/451,802

[22] Filed: May 26, 1995

[51] Int. Cl.⁷ ....................................... G06F 13/00
[52] U.S. Cl. ........................... 711/118; 711/131; 711/158; 711/122; 710/260
[58] Field of Search .................... 395/445, 650, 395/733, 735, 736, 672; 711/118, 131, 158, 122; 710/260, 263, 203, 264, 107; 709/102

[56] References Cited

U.S. PATENT DOCUMENTS

| | | | |
|---|---|---|---|
| 3,789,365 | 1/1974 | Jen et al. | 710/264 |
| 4,313,193 | 1/1982 | Nakano et al. | 370/300 |
| 4,805,096 | 2/1989 | Crohn | 710/260 |
| 5,019,971 | 5/1991 | Lefsky et al. . | |
| 5,095,526 | 3/1992 | Baum | 710/267 |
| 5,109,329 | 4/1992 | Strelioff | 710/261 |
| 5,123,094 | 6/1992 | MacDougall | 395/800.3 |
| 5,168,566 | 12/1992 | Kuki et al. | 395/673 |
| 5,187,791 | 2/1993 | Baum | 710/268 |
| 5,193,193 | 3/1993 | Iyer | 710/117 |
| 5,212,777 | 5/1993 | Gove et al. | 395/570 |
| 5,255,371 | 10/1993 | Latimer et al. | 710/5 |
| 5,293,621 | 3/1994 | White et al. | 710/107 |
| 5,339,439 | 8/1994 | Latimer et al. | 710/32 |
| 5,341,249 | 8/1994 | Abbott et al. | 360/46 |
| 5,367,689 | 11/1994 | Mayer et al. | 710/260 |
| 5,369,767 | 11/1994 | Dinwiddie, Jr. et al. | 710/264 |
| 5,371,872 | 12/1994 | Larsen et al. | 711/118 |
| 5,379,434 | 1/1995 | DiBrino | 710/264 |
| 5,392,435 | 2/1995 | Masui et al. | 710/260 |
| 5,588,125 | 12/1996 | Bennett | 710/126 |

OTHER PUBLICATIONS

Andrew S. Tanenbaum, "Modern Operating Systems", 1992, Prentice Hall Inc., pp. 61–71.

*Primary Examiner*—Eddie P. Chan
*Assistant Examiner*—Hong Kim
*Attorney, Agent, or Firm*—Robert A. Walsh; Andrew J. Dillon

[57] ABSTRACT

A system for managing the flow of real time data streams into a data system cache memory is disclosed. The data system includes a central processing unit or micro controller, with a cache memory, which operates at a relatively fast operating speed, near that of the central processing unit. An interrupt controller is provided as well as a quantization timer that disables the interrupts to the CPU during an execution quantization (EQ) period, and allows the interrupts to pass at an EQ boundary. In operation, the quantization timer controls interrupts to occur only when cache load actions are at a specific quantized time, thus ensuring that a given task in the cache will execute or load for a given quantized length of time, and therefore, the possibility of loading a cache randomly only to execute a few instructions is eliminated.

9 Claims, 3 Drawing Sheets

APPARATUS FOR PERFORMING REAL TIME CACHING UTILIZING AN EXECUTION QUANTIZATION TIMER AND AN INTERRUPT CONTROLLER

BACKGROUND OF THE INVENTION

1. Technical Field

The present invention relates to data processing systems and, more particularly, to data processing systems that use relatively high speed cache memory in addition to relatively low speed main memory. More particularly still, the present invention relates to a data processing system having a cache memory that gates off interrupts until a specific number of instruction occur using an quantization execution protocol.

2. Description of the Related Art

Cache memory has long been used in data processing systems to decrease the memory access time for the central processing unit (CPU) thereof. A cache memory is typically a relatively high speed, relatively small memory in which active portions of a program and/or data are placed. The cache memory is typically faster than main memory by a factor of five to ten and typically approaches the speed of the CPU itself. By keeping the most frequently accessed instruction or data or both, in the high speed cache memory, the average memory access will approach the access time of the cache.

The active program instructions and data may be kept in a cache memory by utilizing the phenomena known as "locality of reference". The locality of reference phenomena recognizes that most computer program instruction processing proceeds in a sequential fashion with multiple loops, and with the CPU repeatedly referring to a set of instructions in a particular localized area of memory. Thus, loops and subroutines tend to localize the references to memory for fetching instruction. Similarly, memory references to data also tend to be localized, because table look-up routines or other iterative routines typically repeatedly refer to a small portion of memory.

In view of the phenomena of locality of reference, a small, high speed cache memory may be provided for storing a block of memory containing data and/or instructions which are presently being processed. Although the cache is only a small fraction of the size of main memory, a large fraction of memory requests over a given period of time will be found in the cache memory because of the locality of reference property of programs.

In a CPU which has a relatively small, relatively high speed cache memory and a relatively large, relatively low speed main memory, the CPU examines the cache when a memory access instruction is processed. If the desired word if found in cache, it is read from the cache. If the word is not found in cache, the main memory is accessed to read that word, and a block of words containing that word is transferred from main memory to cache memory. Accordingly, future references to memory are likely to find the required words in the cache memory because of the locality of reference property.

The performance of cache memory is frequently measured in terms of a "hit ratio". When the CPU refers to memory and finds the word in cache, it produces a "hit". If the work is not found in cache, then it is in main memory and it counts as a "miss". The ratio of the number of hits divided by the total CPU references to memory (i.e. hits plus misses) is the hit ratio. Experimental data obtained by running representative programs has indicated that hit ratios of 0.9 (90%) and higher may be obtained. With such high hit ratios, the memory access time of the overall data processing system approaches the memory access time of the cache memory, and may improve the memory access time of main memory by a factor of five to ten or more. Accordingly, the average memory access time of the data processing system can be improved considerably by the use of a cache.

Data processing systems are typically used to perform many independent tasks. When a task is first begun, the hit ratio of the cache is typically low because the instructions and/or data to be performed will not be found in the cache. Such a cache is known as a "cold" cache. Then, as processing of a task continues, more and more of the instructions and/or data which are needed may be found in the cache. The cache is then referred to as a "warm" cache because the hit ratio becomes very high.

In order to maximize the hit ratio, many data processing system architectures allow system control over the use of the cache. For example, the cache may be controlled to store instruction only, data only, or both instructions and data. Similarly, the cache may be controlled to lock a particular line or page in the cache, without allowing overwrites.

Cache memory is often used in high speed data processing system architectures which also often include multiple interrupt levels. As is well known to those having skill in the art, an interrupt may be an "external" interrupt, for example from a keyboard, disk drive, or other peripheral unit, or may be an "internal" interrupt from an internally generated timer. Upon occurrence of an interrupt, a first (interrupting) task is performed. The interrupted task may be resumed after completion of the interrupting task.

One example of a cache operating system that operates with interrupt requests is a visible caching operating system (VCOS, which is a trademark of AT&T) and is a real time system having a visible cache. A visible cache is a cache that is visible to the users of the system, unlike conventionally hidden caches, which are typically only visible to the operating system. In VCOS, there is only one execution frame and in that frame, tasks are executed sequentially. VCOS cache systems are typically small, around one to two k-words, and store program code and data in the host system's memory since the system does not have its own memory beyond the cache. The caches are kept small so that data can be easily transferred from the host memory to the cache without significantly degrading the system's real time performance. All tasks must fit within the cache, as the miss penalty is severe if data has to be fetched from the host memory. The cache load and unload takes place sequentially before and after a task's execution. This is moderated by use of large frame sizes, typically 10 milliseconds (ms), so that the tasks are correspondingly larger, as they must operate on a larger number of samples. The load and unload time is, therefore, not as large a percentage of the execution time as it otherwise would be.

The tasks that can execute on this type of a system are limited by both the cache size and the frame size. Tasks must be able to function in the given execution frame. If they need a shorter frame, they must do multiple frames' worth of work in the one larger frame, and if they need a larger frame, they must either split up the work among multiple frames, or do nothing in some frames. Whenever a task is idle in some frames is a waste of real time resources. Also, unless a task is executing in its desired frame, or possibly a multiple thereof, it will be inefficient; however, this solution leads to a functioning caching system, which is not trivial. Tasks are limited to the cache size because the data signal processor executes out of host memory space, so there is no effective way to service a cache miss without forfeiting all of the system's real time capabilities.

Yet another solution to real time caching problem is the strategic memory allocation for real time (smart) cache. The smart cache was developed for use in real time systems that use rate monotonic scheduling; however, the smart cache should work in systems using any preemptive scheduling algorithm. A system using the smart cache can achieve processor utilization within 10% of a system using a normal cache, and the smart cache is deterministic.

The smart caching scheme entails dividing the cache into partitions. These partitions are then allocated among the tasks that are to be run on the processor. One larger partition is reserved as the shared pool and acts as a normal cache. The shared pool allows shared memory to be cached without complicated cache coherency schemes. The shared pool can also be used to cache tasks when there are no available private partitions remaining.

The allocation of partitions is static since, if it were dynamic, some tasks would miss their deadlines while the cache was being reallocated. This means that tasks meant to be run on the processor must be known ahead of time, so that a static analysis can be made to determine which tasks can use which partitions. Partitions can be reallocated dynamically, but it is time consuming. When reallocating partitions, this can lead to tasks missing their deadline before completion. The allocation scheme, however, is useful in that it allocates partitions in such a manner that the utility of each cache partition is maximized. Unfortunately, to accomplish this, it is necessary to have detailed information about each task's hit and miss rates given an arbitrary sized private cache. Once the partitions are allocated, the tasks own their partitions. Essentially, this means that only the task to which a partition is allocated can use that partition, so that data is preserved across preemptions.

Another drawback to the smart cache is that it requires additional instructions in the instruction set to control which partitions are being accessed, either the private ones or the shared ones. This requires that the programmer or the compiler know too much about the actual hardware and implementation, which may change. This makes it difficult to write software that can run on a variety of systems with different caches, as well as systems that use Static Random Access Memory or SRAM and no cache.

Accordingly, what is needed is a caching scheme that minimizes preemptive priority driven scheduling so that the preemption does not occur at a random time, but a critical time, such as when a cache is loaded with a line or page ready for execution.

SUMMARY OF THE INVENTION

It is therefore one object of the present invention to provide data processing systems.

It is another object of the present invention to provide data processing systems that use relatively high speed cache memory in addition to relatively low speed main memory.

It is yet another object of the present invention to provide a data processing system having a cache memory that gates off interrupts until a specific number of instruction occur using an quantization execution protocol.

The foregoing objects are achieved as is now described. According to the present invention, a system for managing real time data streams into a cache array is disclosed. The cache array is part of a data processing system that has a central processing unit. The central processing unit is coupled to the cache array, which is multi-port cache array. The system further includes a cache loader, coupled to the cache array and further coupled to a large, relatively slow compared to the cache array, main memory. The managing system further includes an interrupt controller, coupled to the central processing unit, for controlling any interrupts directed towards the CPU, and a quantization timer, which is coupled to the interrupt controller. The quantization timer limits any interrupts on the CPU from executing until or after an execution quantization duration has occurred. This fixed execution quantization duration is typically equivalent to a load action, which is completed in a specific number of quantized blocks, within the cache array. The system further comprises gating logic for gating off any interrupt received and is part of the interrupt controller. The interrupts are gated off during any cache load or unload operation or during any execution operation.

The cache array further comprises a first partition, a second partition, and a third partition. The first partition is coupled to the main memory and the second partition is coupled to the CPU. The third partition is coupled to both the first and second partitions and to the CPU wherein a portion of the operating system running the CPU is stored. One of the partitions is accessed by the cache loader while the other partition is accessed by the CPU, but both partitions may not be accessed by either the loader or the CPU simultaneously.

The gating logic further includes means for latching and time stamping all interrupts received by the gating logic for later execution by the CPU according to their time of receipt.

The interrupt controller also is able load a quantization block into one partition of the cache array while another quantization block is being executed by the CPU.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
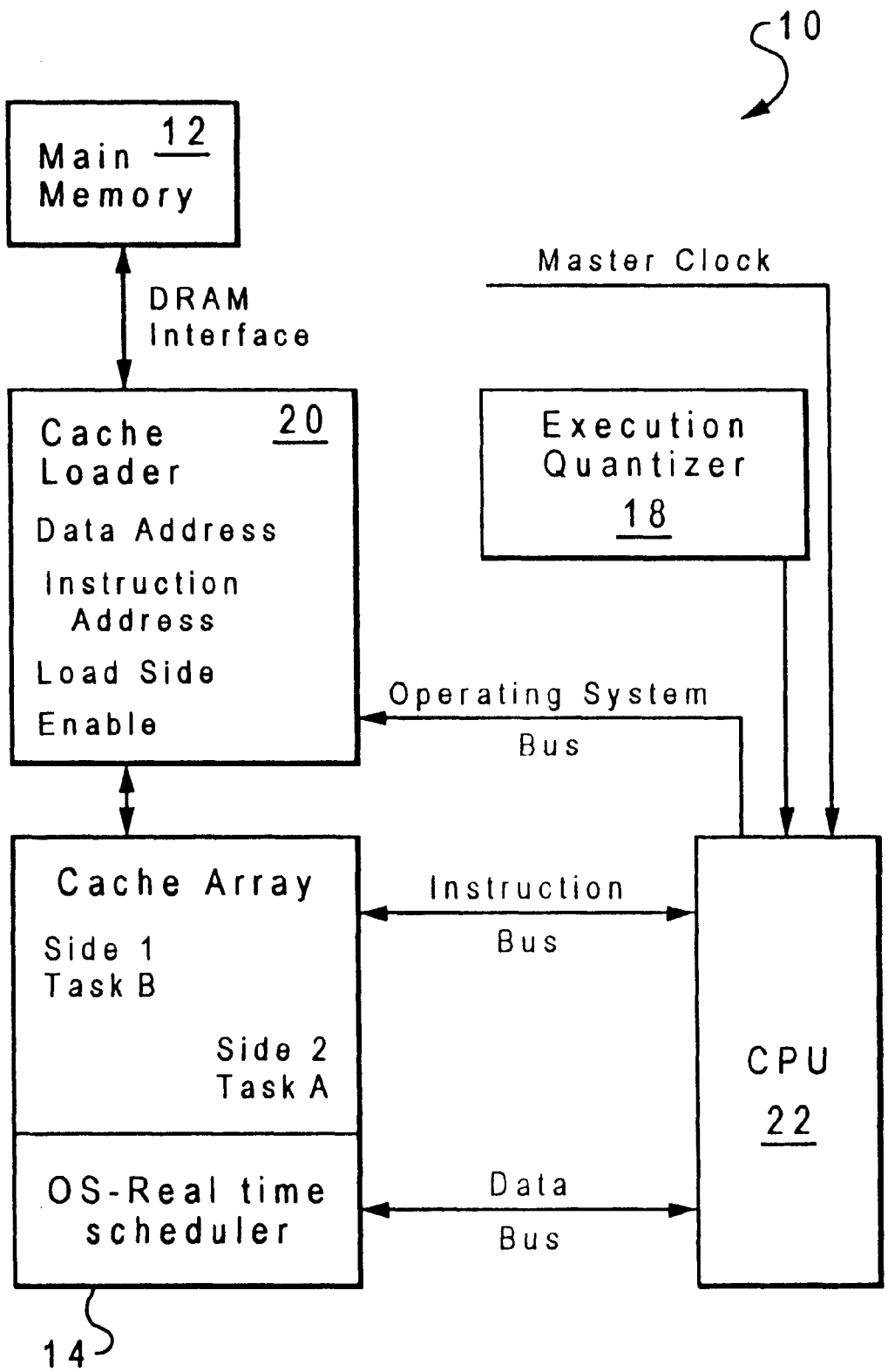
FIG. 1 depicts in accordance with a preferred embodiment of the present invention a data processing system including a cache array.

Referring now to FIG. 1, a data processing system 10 including a cache loader 20, main memory 12, cache array 14, execution quantizer 18, and a central processing unit (CPU) 22 is disclosed. CPU 22 executes a schedule of tasks driven from a set of periodic interrupts A, B, and C (see FIG. 2). These periodic interrupts impose deadlines on tasks (also executing on CPU 22). In other words, the task cannot start before its corresponding interrupt occurs and must finish before its next corresponding interrupt. Execution quantizer 18 controls the deadlines and priority of interrupts to be executed. Execution quantizer 18 also establishes, within its schedule, information of which task should now be running or has highest priority, and which task should run next. This information is used to control cache loader 20 to prepare the instructions and data in cache array 14 of the next task.

The Cache Loader 20, in response to CPU's 22 request, loads Cache Array 14 from Main Memory 12, which is where all task instruction and data reside. Further, memory 12 may be comprised of a plurality of asynchronous memories.

Cache Array 14 is a multi-port cache and partitioned into three regions: the operating system (OS) space, which is always pinned or available, Side 1, which holds task B, and Side 2, which holds task A. Side 1 and Side 2 can act in ping pong fashion that enables the load to take place at the same time as the execution. CPU 22 connects to Cache Array 14 via an instruction bus for accessing Side 2 while a data bus connects to the OS real time scheduler portion of Cache Array 14. Additionally, an operating system bus connects CPU 22 to Cache Loader 20, which is further connected to Cache Array 14 via an instruction bus also. Further, Cache Loader 20 is connected to Main Memory 12 via a Dynamic Random Access Memory or DRAM interface.

With the introduction of the cache array 14 each task can now execute in a pipelined fashion under the control of the schedule. The first phase of the pipe is the load phase (cache loader 20 moving task from main memory 12 to cache array 14), moving next to the execution phase (CPU 22 executing task), and finally the writeback phase (Cache Loader 22 writing from cache array 14 back to main memory 12).

Figure 2:
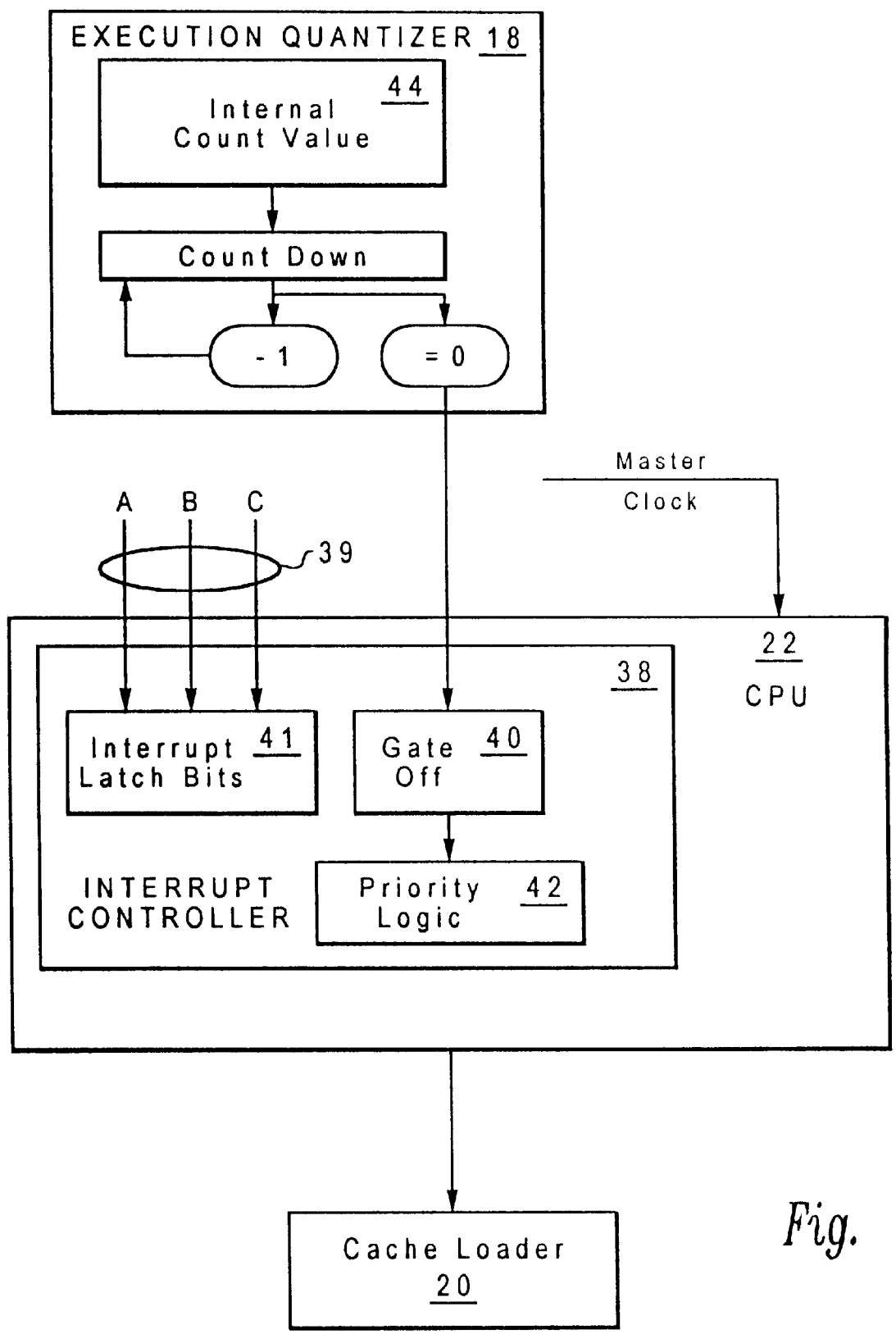
FIG. 2 depicts a schematic design of a Quantization Timer and interrupt logic.

Referring now to FIG. 2, a detailed block diagram of execution quantizer 18 and CPU 22 is shown with CPU 22 further including an interrupt controller 38, which is further connected to execution quantizer 18. A plurality of hardware asynchronous clock interrupts 39, which include A, B, and C, enter in and are stored temporarily in an interrupt latch bits register 41, which is further connected to gating circuit 40. Interrupt controller 38 further includes an interrupt gating circuit 40 and priority logic 42. Interrupt controller 38, while being shown to be a part of CPU 22, which performs the operations of interrupt controller 38 via software programming, may also be a separate programmable logic unit from CPU 22 and would then be connected to both CPU 22 and execution quantizer 18.

Execution quantizer 18 further comprises initial count value register 44. Execution quantizer 18 is a simple counter that is initialized with the number of instructions that are in one quantization block and is stored in initial count value register 44. The count is then clocked with a system clock master and is decremented by one each cycle until the counter becomes zero. The system master clock also clocks CPU's 22 operation in performing or executing tasks and marshalls the asynchronous clock interrupt 39. Once the counter becomes zero, it has reached a quantization boundary. At that point, the interrupts become visible to the processor and the counter is reset to its initial value. While the operating system is running, the counter is not clocked, as that time is not part of a quantization block. Interrupts are gated off while a quantization block is being processed.

To minimize, or eliminate, the problems of preemptions, loader 20 provides means to guarantee that each task is executed for a certain length of time once it starts running. By providing this guarantee, the possibility of loading the cache only to execute a few instructions is eliminated. This is the basis for execution quantization (EQ). In EQ, time is broken up into equal sized quantization blocks. Each quantization block is a period of time in which only one task can execute, so once a task begins execution, it is guaranteed that it can execute for the entire quantization block. These quantization blocks are separated by quantizations boundaries. A quantization boundary is a length of time during which the scheduler can become active and decide which task is to be executed in the next quantization block. Effectively, the scheduler sees time discretely, as it only make decisions on the equally spaced quantization boundaries.

There are two limitations with respect to EQ. The first limitation that 100% processor utilization cannot be achieved since the scheduler cannot make decisions on a fine enough granularity thus leading to times when the processor sits idle even though there are tasks waiting the be run. This penalty, however, is minimal and does not limit the usefulness of EQ. The second limitation is that tasks must execute for the duration of an indeterminate number of quantization blocks. This limitation arises because the scheduler can only make decisions on quantization boundaries, so if a task completes execution in the middle of a quantization block, a new task cannot be switched until the next quantization boundary.

Despite these limitations, EQ deterministically allows arbitrary task sets to achieve processor utilizations that are very close to, if not at, the maximum possible utilization of the scheduling algorithm. This means that dynamic selectability can achieve nearly, if not actually, 100% Millions of Instructions Per Second (MIPS) utilization. In addition, EQ allows tasks to be guaranteed that the y will be executed for a given length of time before they can be preempted. Significantly, with the use of EQ and dynamic deadline scheduling, a cache that is transparent to the programmer can be incorporated into a real time system, which has not been possible before without succumbing to very low processor utilizations. By contrast, traditional, or rate monotonic algorithms can only achieve at most, a 60% MIPS efficiency level. Significantly, since the three different hardware interrupts are operating at three different asynchronous clock speeds, the dynamic scheduling allows the three different clock timings to use 100% of processor MIPS capability.

Interrupts are used to define frame boundaries, but the interrupts must be delayed until the cache system has an opportunity to complete its transaction. The interrupts still need to be latched and time stamped when they occur to insure that the interrupts are even eventually able to reach the processor with accurate timing information. The time stamp is used to determine an estimate of when a frame's deadline will occur. By using hardware to delay the arrival of interrupts to fall on a cache task operation, the regular dynamic deadline scheduling can be used with only minor modifications to control the loader. Cache control is enforced by not allowing an interrupt to interfere with a task's execution in the middle of a cache control operation.

Figure 3:
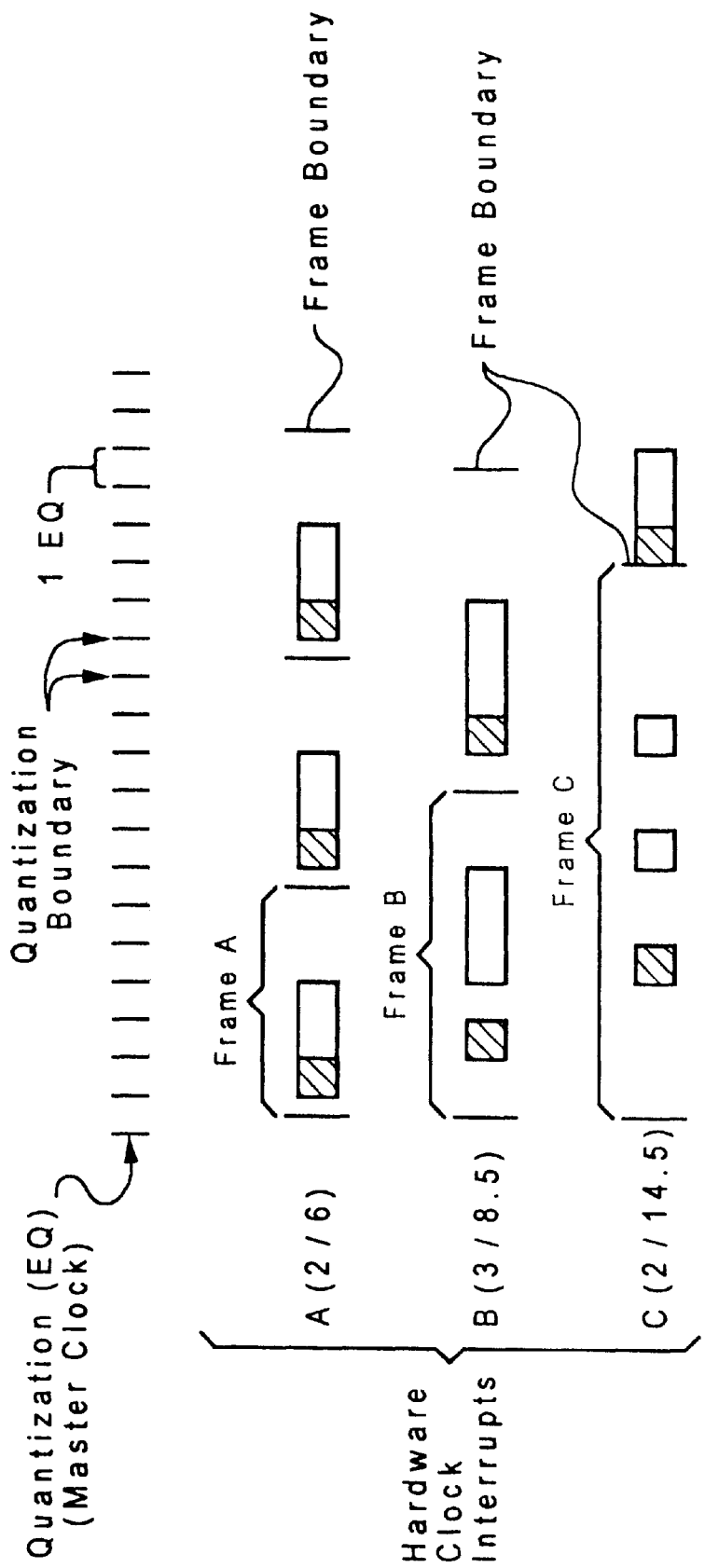
FIG. 3 is a timing diagram where three frames are running in an execution quantized environment.

Referring again to FIG. 2, the gating off 40 of interrupts is the basis for execution quantization (EQ), which gates off interrupts until a specific number of instructions has occurred, as determined by priority logic 42. This allows a predictable number of instructions to be completed before a preemption occurs. This, when used in conjunction with a cache loader, which can run simultaneously with execution, can allow the most efficient operation of the machine for running steps in real time. FIG. 3 illustrates a timing diagram where three hardware clock interrupts A, B, and C, are running in an execution quantized environment. The quantization value, which is repeating and equals n instructions per cache load time or the number of n instructions that can be executed in the given time. Hardware clock interrupt A is capable of performing two executions per six quantization units (2/6); hardware clock interupt B is capable of performing three execution units per 8.5 quanrization units (3/8.5); and hardware clock interrupt C is capable of performing two execution units per 14.5 quantization units (2/14.5).

EQ deterministically allow arbitrary task sets to achieve processor utilizations that are very close to the maximum utilization of the scheduling system. In addition, EQ assures that tasks execute for a given length of time before they can be preempted. With the use of EQ and dynamic deadline scheduling, a cache that is transparent to the programmer can be incorporated into a real time system. Thus, referring back to FIG. 3, with the loader action and the execution action being quantized, the processor effectively performs constant execution depending upon the contents placed by the cache loader.

For example, in the first frame within interrupt A, the cache loader action of task A, signified by the dark square, first occurs followed by an execution action of task A for two quantization units. Meanwhile, in interrupt B, a cache loader action of B begins during the execution phase of the first frame of interrupt A, but the execution of task B does not occur until the completion of the execution of task A. Once task B begins executing, then task C performs its cache loader action, which may also occur just after the cache loader action ends for task B, but not during any time that the task A or the task B cache loader is operating. Upon completion of the execution of task B, then the execution of task C begins while also the cache loader action of task A begins again. Upon completion of the cache loader action of task A, and upon the completion of task C, the execution of task A begins again for two quantization blocks. Tasks C are staggered so that when either task B or task A are not executing, task C executes, thus maximizing processor efficiency by not allowing any down time during the execution. The hierarchy, however, may change and is determined largely by the tasks needing to be executed. So, task C may have the highest priority, if task C is deemed to be the first task to run, as decided by priority logic 42. This decision is based in part on the task having the earliest completion deadline.

Any task set, which includes a cache loader action and execution, whose processor utilization U can be scheduled in a system with a cache using dynamic deadline scheduling and EQ. The operating system executes between quantization blocks and the time denoted as the quantization boundary. The size of the boundaries is only increased when the operating system must execute. Since the operating system only executes for very short periods of time, subsequent quantization blocks are not delayed very long. If the operating system's utilization is U, the EQ is feasible. This follows simply from the fact that tasks cannot make use of resources that are needed for the operating system. Once those resources are reserved, removing three quantization blocks out of the fastest frame on the system still guarantees that tasks will have sufficient slack time to allow loading, quantization, and unloading.

Execution quantization is used to facilitate cache management. If quantization blocks are long enough to unload the cache and reload it with new data, then a task's data can be loaded in the quantization block preceding its execution, and unloaded in the quantization block succeeding its execution. For example, in a system having instructions that are immutable, such as, for example, the IBM M-Wave system, immutable meaning they do not have to be unloaded back into memory, and coefficient and other immutable data does not have to be unloaded either. Also, depending upon the hardware, simultaneous loading and unloading is possible. In the preferred embodiment, the functionality of the loader and unloader are controlled by the operating system for use by all tasks on the machine, rather than by a single frame manager for exclusive use of that frame managers tasks.

Every time there is an interrupt from one of the periodic interim sources, or a task completes its execution, the scheduler must decide which task should execute next. Since interrupts occur quite often, the operating system is frequently executing small sections of code. In a preferred embodiment, the system would store the operating system in its own cache partition that is locked in place. This allows the operating system to execute immediately without waiting for its data to be loaded.

Unfortunately, the operating system does not integrate well into execution quantization. Since the operating system only executes small sections of code, it is not practical to make to operating system use an entire quantization block every time it needs to make a scheduling decision. If the operating system is allowed to execute within a quantization block without using the whole block, then the task that uses the rest of that block is not guaranteed that it can execute for an entire quantization block. To resolve this, the system guarantees that only the time in the quantization block minus the longest path in the operating system is available for real time use. Unfortunately, because the operating system only needs to execute in some fraction of the quantization blocks, there is a lot of time that is not available for real time use. Additionally, the real time that must be devoted to the operating system is dependent on the size of the quantization block. This is undesirable as it drives the quantization blocks to be larger in order to reduce the overhead of the operating system, where it is advantageous to have the quantization blocks as small as possible to allow the scheduler to make decisions on as fine a granularity as possible.

Accordingly, the system provides that the operating system executes between quantization blocks in the time denoted as the quantization boundary. The size of the boundaries is only increased when the operating system must execute. Since the operating system only executes for very short periods of time, this does not adversely affect the scheduling method.

Referring back to FIG. 1, FIG. 1 also illustrates a flow of the cache. Cache array 14 is effectively a two-port cache, which is either multiplexed in time from a single port or has two separate arrays, such that one side can be loaded while the other side is being executed. A separate region within cache memory 14 is reserved for the operating system (OS) and is held or pinned such that the OS is available for media use at any time.

In cache memory 14 there are two cache partitions that can be used for tasks and one partition that is locked that is always used for the operating system. Cache loader 20 has access to both cache partitions as does the central processing unit 22. For the duration of any given quantization block, however, the loader and unloader can only access one of the partitions and the CPU can only access the other partition. By restricting access to different partitions, the loading hardware and the processor cannot interfere with each other in the cache. The operating system has control of which partition is available to the CPU and which one is available to the loader and the unloader. The loader and unloader can be the same or separate hardware, depending on the specifics of a given implementation, such specifics would be well known to those skilled in the art. If the instructions are immutable, then they do not need to be copied back to memory and could be overwritten while the data is being unloaded. It is also possible to either use one cache for both instructions and data, or to have separate caches, one for instructions and one for data.

The operating system is loaded into its partition once and then is completely self-contained. The instructions are always available for use and there must be enough room in the partition to store all the possible data that the operating system may need to access. This allows that the operating system never has to wait for the cache to be loaded.

While the invention has been particularly shown and described with reference to a preferred embodiment, it will be understood by those skilled in the art that various changes in form and detail may be made therein without departing from the spirit and scope of the invention.

We claim:

1. A data processing system comprising:
   a central processing unit;
   a multi-port cache array coupled to said central processing unit;
   a cache loader, coupled to said multi-port cache array;
   a main memory unit, comparatively slow to said cache array, coupled to said cache loader;
   a plurality of asynchronous clock interrupts, coupled to said central processing unit;
   an interrupt controller, coupled to said central processing unit, for managing real time data streams into said cache array;
   an execution quantizer coupled to said interrupt controller, wherein said execution quantizer limits any interrupts on said central processing unit from said plurality of asynchronous clock interrupts from executing after a fixed execution quantization (EQ) time; and
   gating logic, coupled to said execution quantizer, for gating off any interrupts received during a cache load or cache unload operation of a quantized block so as to allow said interrupts to be processed after completion of said cache load or unload operation.

2. The invention according to claim 1 wherein said multi-port cache array further comprises a first partition, coupled to said main memory and a second partition, coupled to said central processing unit, and a third partition, coupled to said first and second partitions and said central processing unit wherein a portion of an operating system is stored in said third partition.

3. The invention according to claim 1 wherein said quantization timer also perform latching and time stamping all interrupts received by said gating logic for later execution according to their time of receipt.

4. The invention according to claim 1 wherein said interrupt controller further performs loading of a quantization block while another quantization block is being executed.

5. The invention according to claim 1 wherein an operating system executes between quantization blocks in a time frame denoted as a quantization boundary.

6. The invention according to claim 2 wherein one of said partitions is accessed by said cache loader and the other partition is accessed by said central processing unit, but both partitions are not be accessed by both said cache loader and said CPU simultaneously.

7. A data processing system comprising:
   a central processing unit;
   a multi-port cache array coupled to said central processing unit;
   a cache loader, coupled to said multi-port cache array;
   a plurality of asynchronous memory units, comparatively slow to said cache array, coupled to said cache loader;
   a plurality of asynchronous clock interrupts, coupled to said central processing unit;
   an interrupt controller, coupled to said central processing unit, that manages real time data streams from said plurality of asynchronous memory units to said cache array as directed by any of said of asynchronous clock interrupts;
   an execution quantizer, coupled to said interrupt controller, wherein said execution quantizer limits any interrupts on said central processing unit from said plurality of asynchronous clock interrupts from executing after a fixed execution quantization (EQ) time; and
   a gating logic, coupled to said execution quantizer for gating off any interrupts received during a cache load or unload operation of a quantized block so as to allow said interrupts to be processed after completion of said cache load or unload operation.

8. The data processing system according to claim 7, wherein said multi-port cache array further comprises a first partition, coupled to said main memory, and a second partition, coupled to said central processing unit, wherein one of said partitions is accessed by said cache loader and the other partition is accessed by said central processing unit in an asynchronous manner, but not simultaneously.

9. The data processing system according to claim 7, further comprising a master clock, coupled to said central processing unit, wherein said master clock clocks all tasks executed by said central processing unit and provides coordination among said plurality of asynchronous clock interrupts.

\* \* \* \* \*